Figure 1:
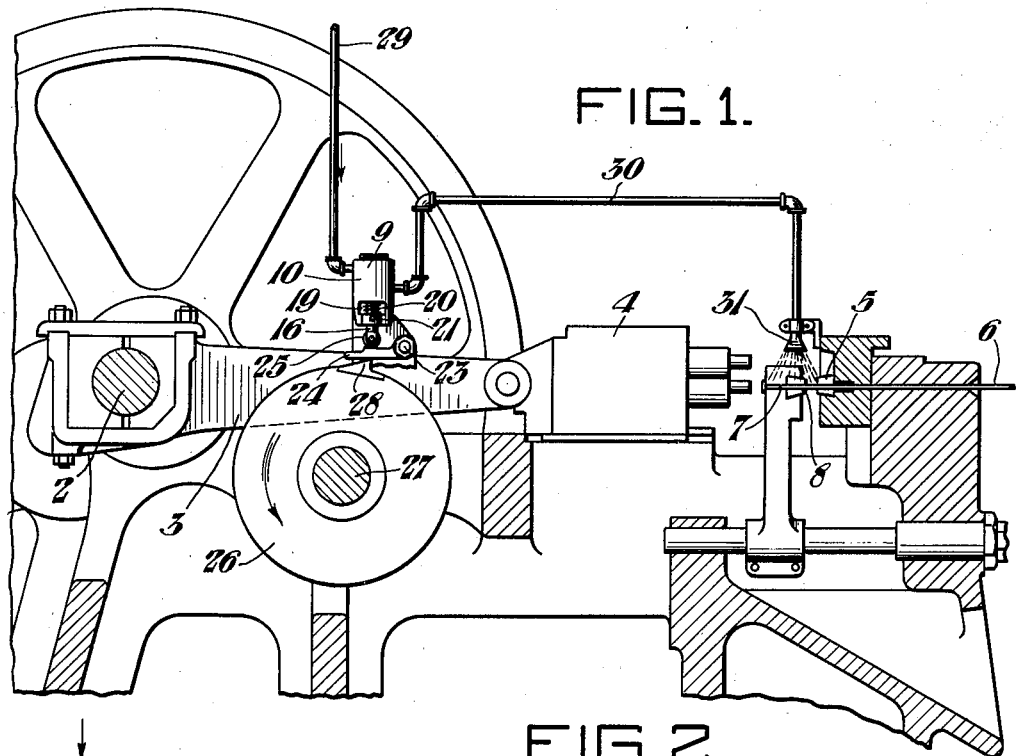

Sept. 10, 1940.  J. B. COCHENOUR  2,214,362

PNEUMATIC MEANS FOR EXPELLING FORMED ARTICLES FROM THE MACHINE

Filed July 6, 1939

Inventor:
JOHN B. COCHENOUR,
by: John E. Jackson
his Attorney.

Patented Sept. 10, 1940

2,214,362

UNITED STATES PATENT OFFICE 2,214,362

PNEUMATIC MEANS FOR EXPELLING FORMED ARTICLES FROM THE MACHINE

John B. Cochenour, Donora, Pa., assignor to The American Steel and Wire Company of New Jersey, a corporation of New Jersey Application July 6, 1939, Serial No. 283,081

4 Claims. (Cl. 10—43)

This invention relates to an improved means for expelling small articles from the machine in which they are formed and, particularly, to a pneumatic means for expelling articles, such as nails, from nail manufacturing machines and the like.

Various types of expellers have been suggested and used in connection with nail manufacturing machines for the purpose of removing the nails therefrom after they are formed. In most cases, a mechanical expeller was employed which generally proved to be satisfactory for expelling the smaller sizes of nails, but it was not entirely satisfactory for expelling the larger size nails, in that it was too slow in its operation and, consequently, reduced the speed at which the machine could be operated.

Heretofore, certain types of nails and, usually, the larger size nails, that is, over 10d, could not be satisfactorily manufactured unless the speed of the machine was reduced to a point so that each nail, as it was successively formed, would fall from between the forming dies by the force of gravity and have sufficient time to clear the hammer and other forming parts of the machine before the beginning of the next working stroke or forming cycle of the machine for the next nail.

It was found that, by expelling the nails from the machine by means of a jet of compressed air, the nails would be quickly expelled from between the forming dies and the machine could be operated at a much greater rate of speed, approximately twice as fast as before, which resulted in increased efficiency and a substantial saving in the operation thereof and, consequently, in reducing the cost of manufacture of the nails. However, it was found to be quite expensive to maintain a continuous flow of compressed air into the machine between the dies thereof and, as it was necessary to impart an impinging flow of compressed air against the nails only after they were formed, the pneumatic expelling means of the present invention was devised.

It is one of the objects of the present invention to provide an improved means which acts intermittently to expel small articles from between the dies in the machines in which they are successively formed.

It is another object of the invention to provide an improved pneumatic means for expelling articles, such as nails and the like, from the machine in which they are successively formed, which is automatically actuated by the machine at predetermined intervals and, at the same time, one which will permit the machine to be operated at an increased rate of speed.

It is a further object of the invention to provide an improved simple and inexpensive pneumatic means for expelling articles, such as nails and the like, from the machine in which they are successively formed, which is not only efficient and reliable in its use but also one which will prolong materially the life of the dies and other forming parts of the machine.

Various other objects and advantages of this invention will be more apparent in the course of the following specification and will be particularly pointed out in the appended claims.

In the accompanying drawing there is shown, for the purpose of illustration, one embodiment which my invention may assume in practice.

Figure 2:
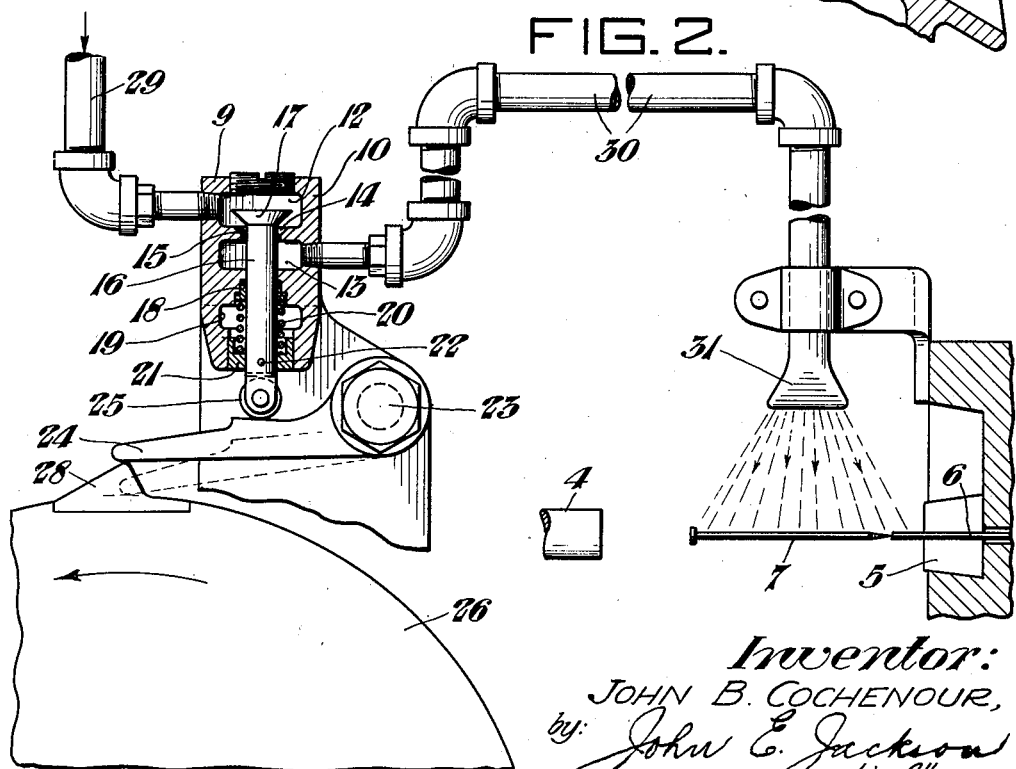

In the drawing:

Figure 1 is a side elevation partly in section of a nail manufacturing machine with which the improved pneumatic expelling means of my invention is shown incorporated; and, Figure 2 is an enlarged side elevation of the pneumatic expelling means showing the valve thereof in section.

Referring more particularly to the drawing, the improved pneumatic expeller of my invention is shown incorporated with a conventional type nail manufacturing machine, but it will be understood that it may be used with any machine in which small articles are fabricated. The particular machine with which the present invention is shown comprises a crank shaft 2 having a connecting rod 3 connected thereto which is adapted to reciprocate a hammer or movable die head 4 positioned opposite a stationary pinch die 5. The continuous length of wire 6 is fed into the machine through the pinch die 5 and the nails 7 are formed therefrom through the cooperation of the hammer or reciprocating die 4 and the pinch die 5, as is well known to those skilled in the art. There is also provided on the machine a cut-off knife 8 actuated by means (not shown) for cutting the nails from the continuous length wire 6 after they have been formed.

According to the present invention, there is suitably mounted on the machine a valve 9 comprising a body or housing 10 having an upper inlet chamber 12 and a lower exhaust chamber 13 which are interconnected by means of a port hole 14 having a valve seat 15 associated therewith in the upper chamber. There is axially arranged in the body 10 a reciprocating valve stem 16 having a portion 17 on the upper end thereof which is adapted to cooperate with the seat 15 in the port 14 to close the valve. There is also arranged in the valve body 10 below the exhaust chamber 13 around the valve stem 16, a packing gland 18 which is adapted to prevent the air or other fluid from escaping therebelow. There is arranged around the valve stem 16, toward the bottom end thereof and housed in an opening 19 in the lower part of the valve body 10, preferably a coil spring 20 which is adapted to normally keep the valve closed. The coil spring 20 preferably acts between the packing gland 18 and a cross head 21 secured to the valve stem 16 adjacent the bottom thereof preferably by means of a cross head pin 22.

There is suitably pivoted to the frame of the machine at 23, below the valve, a buffer or lever 24 which is adapted to cooperate with and contact a roller 25 suitably arranged on the lower end of the valve stem 16. The outer end of the buffer or lever 24 is adapted to contact at all times the periphery of a cam wheel 26 fixedly secured to a driven auxiliary shaft 27 carried by the machine. The cam wheel 26 has preferably a cam 28 arranged on the periphery thereof which is adapted to actuate the lever 24 and the valve, as will be described later in the specification.

The inlet chamber 12 is connected to a relatively high pressure air or other fluid supplying means by means of a supply inlet pipe 29, and the exhaust chamber 13 is connected to a discharge means, such as the discharge pipe line 30, which is adapted to convey the air or other fluid from the valve and discharge it preferably through a bell-shaped nozzle 31 positioned opposite the point where the nails or other articles are formed, that is, at a point between the hammer or movable die head 4 and the stationary pinch die 5.

The improved pneumatic expeller of my invention operates in the following manner:

A relatively high pressure stream of air is continuously supplied to the inlet chamber 12 of the valve body 10 through the inlet pipe 29 and the valve stem 16 is so positioned that the portion 17 is seated in its seat 15 to normally keep the port 14 closed to prevent the escapement of the air or fluid through the valve. When the machine is in operation, the cam wheel 26 revolves continuously in the direction indicated by the arrow and, at every revolution thereof, the cam 28 carried thereby strikes the end of the buffer or lever 24, thereby pivotally moving it upwardly around its pivot 23. As the buffer 24 moves upwardly, it, in turn, contacts the valve stem 16, moving it upwardly against the action of the spring 20, which, of course, moves the upper portion 17 from engagement with the valve seat 15, thereby permitting the stream of air to flow from the inlet chamber through the valve and discharge line outwardly through the nozzle 31 so as to be impinged on the surface of the formed nail, thus forcing it from between the dies of the machine into a container. After the cam 26 moves out of contact with the end of the buffer or lever 24, the valve stem 16 is moved downwardly due to the action of the coil spring 20 and the portion 17 carried thereby is again seated in the seat 15 and the valve is again closed and remains so until the cam 26 again actuates the buffer 24. The actuation of the pneumatic expeller is repeated as described for each nail formed, that is, it is actuated at each complete cycle of the nail forming machine.

It will be understood that the impinging flow of compressed air against the successive nails as they are formed in the machine not only forces the same therefrom but it also tends to remove small burrs or whiskers that sometimes adhere to the end of the wire after the nails are cut therefrom. This is very important and is one of the advantages of using a high pressure stream of compressed air for forcing the nails from the machine because, if the cutters are not in perfect condition and burrs or whiskers remain on the end of the wire, the whiskers will sometimes break off in the die or hole of the hammer and accumulate there, which will eventually cause the formation of imperfect heads on the nails and, consequently, necessitate the removal of the hammer and dies. It will be seen that the impinging flow of air not only prolongs the life of the dies but the life of the cutters as well.

While I have shown and described one embodiment of my invention, it will be understood that this embodiment is merely for the purpose of illustration and description and that various other forms may be devised within the scope of my invention, as defined in the appended claims.

I claim:

1. In combination with a nail fabricating machine or the like, pneumatic means for expelling the nails from the machine as they are succesively formed therein, including a valve having a reciprocating valve stem associated therewith for opening and closing the same, means for supplying air under a relatively high pressure to said valve, means connected to said valve for discharging the air therefrom against the nails, a spring associated with said valve stem for normally keeping said valve closed, and a rotatable cam member arranged on said machine for intermittently actuating said valve stem to open said valve against the action of said spring after each complete working cycle of the machine, thereby permitting the air to pass through said valve and discharge means so as to be impinged against each nail successively formed to force the same from the machine.

2. In combination with a nail fabricating machine or the like, pneumatic means for expelling the nails from the machine after they are successively formed therein, including, a normally closed valve connected to a relatively high pressure air line, a nozzle arranged adjacent the point of fabrication of the nails in said machine for directing the air against the nails thus formed, means interconnecting said valve and said nozzle for conveying the compressed air thereto, a driven rotatable wheel arranged on said machine opposite said valve, and a cam member arranged on the periphery of said rotatable wheel, said cam adapted to cooperate with said valve so as to open the same after each complete working cycle of the machine whereby a relatively high pressure stream of air is impinged from said nozzle directly against each nail after it is formed therein so as to force the same from the machine.

3. In combination with a nail fabricating machine or the like, pneumatic means for expelling the nails from the machine after they are successively formed therein, including, a normally closed valve having a reciprocating valve stem associated therewith for opening and closing the same, said valve being connected to a relatively high pressure air line, a nozzle arranged adjacent the point of fabrication of the nails in said machine for directing the air against the nails thus formed, means interconnecting said valve and said nozzle for conveying the compressed air thereto, a driven rotatable wheel arranged on said machine opposite said valve, and a cam member arranged on the periphery of said rotatable wheel, said cam adapted to actuate said valve stem so as to open the valve after each complete working cycle of the machine whereby a relatively high pressure stream of air is impinged from said nozzle directly against each nail after it is formed therein so as to force the same from the machine.

4. In combination with a nail fabricating machine or the like, pneumatic means for expelling the nails from the machine after they are successively formed therein, including, a normally closed valve having a reciprocating valve stem associated therewith for opening and closing the same, said valve being connected to a relatively high pressure air line, a nozzle arranged adjacent the point of fabrication of the nails in said machine for directing the air against the nails thus formed, means interconnecting said valve and said nozzle for conveying the compressed air thereto, a driven rotatable wheel arranged on said machine opposite said valve, a cam member arranged on the periphery of said rotatable wheel, and a pivotally arranged lever disposed between the outer free end of said valve stem and thereagainst and the periphery of the rotatable wheel, said cam adapted to cooperate with said lever so as to actuate the same which in turn actuates said valve stem to open the valve after each complete working cycle of the machine whereby a relatively high pressure stream of air is impinged from said nozzle directly against each nail after it is formed therein so as to force the same from the machine.

JOHN B. COCHENOUR.